J. A. SEVEY.
SAW FILING MACHINE.
APPLICATION FILED APR. 6, 1911.

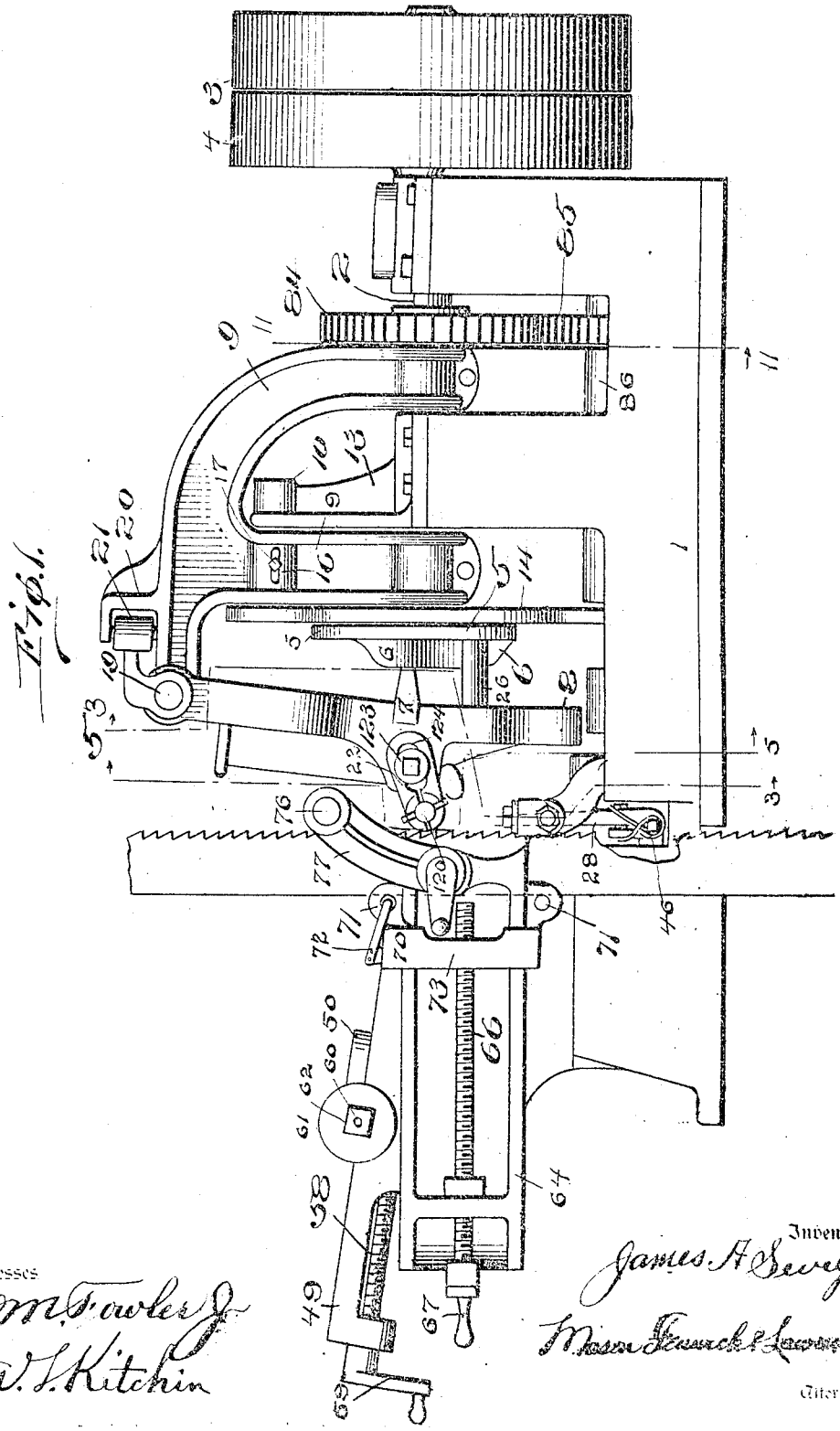

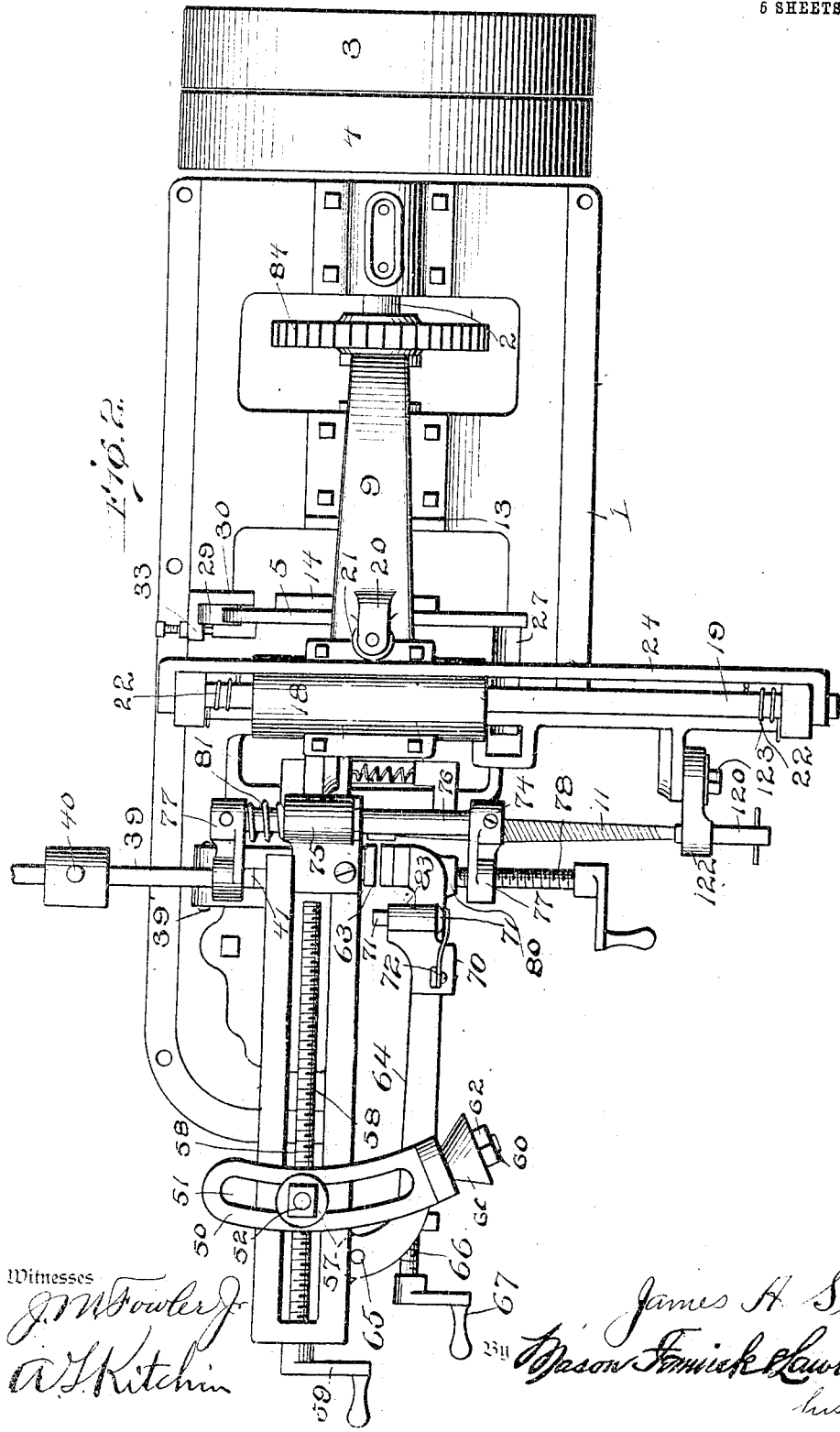

1,091,397.

Patented Mar. 24, 1914.
5 SHEETS—SHEET 3.

Witnesses

Inventor
James A. Sevey
By Mason Fenwick Lawrence
his Attorneys

J. A. SEVEY.
SAW FILING MACHINE.
APPLICATION FILED APR. 8, 1911.
1,091,397.
Patented Mar. 24, 1914.
5 SHEETS—SHEET 4.
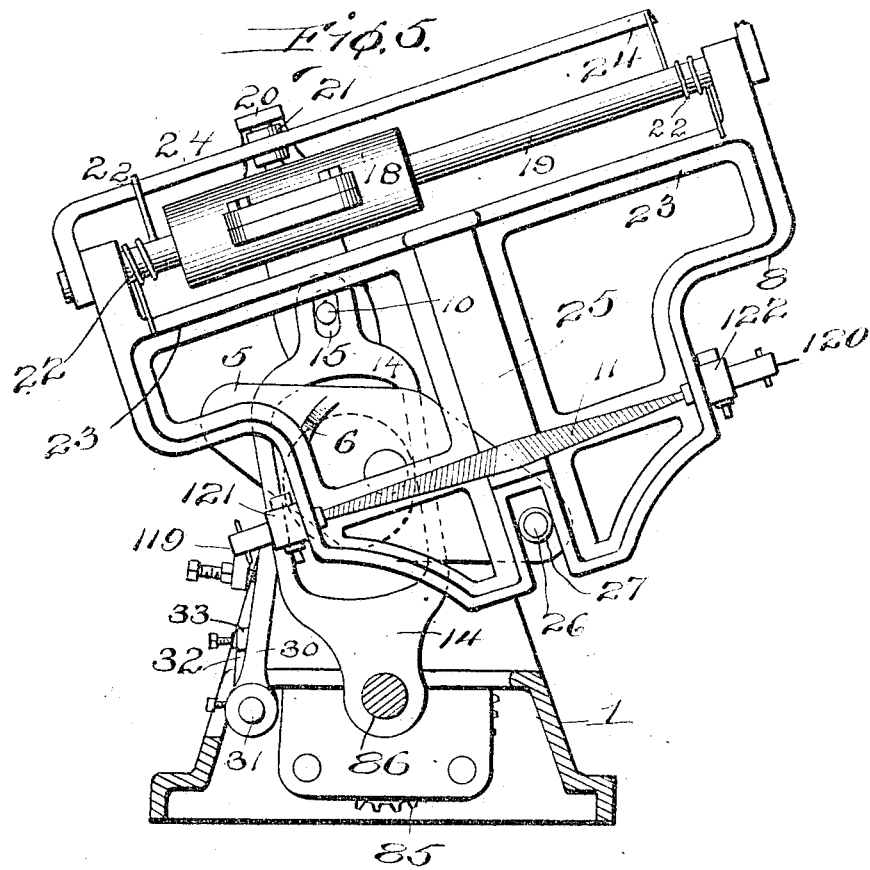
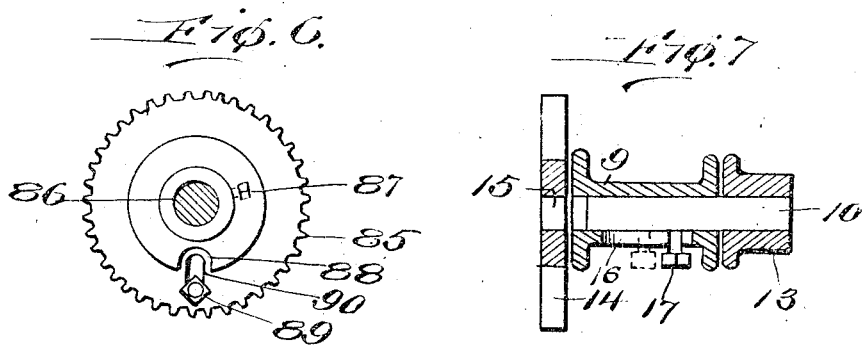
Witnesses
J. M. Fowler Jr.
A. T. Kitchin
Inventor
James A. Sevey
By Mason Fenwick Lawrence
his Attorneys

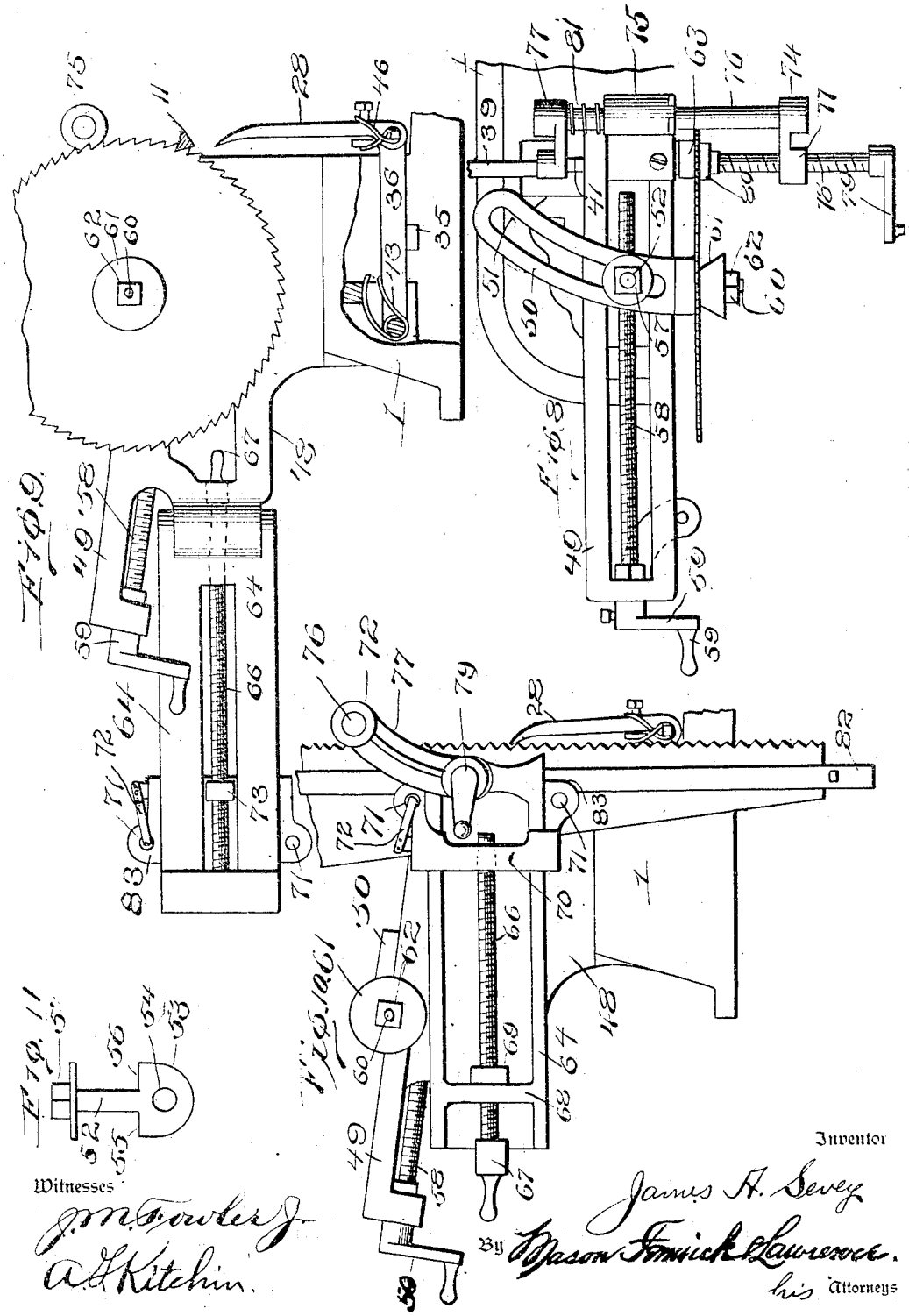

UNITED STATES PATENT OFFICE.

JAMES A. SEVEY, OF SAN MARCOS, TEXAS.

SAW-FILING MACHINE.

1,091,397.

Specification of Letters Patent. Patented Mar. 24, 1914.

Application filed April 8, 1911. Serial No. 619,879.

*To all whom it may concern:*

Be it known that I, JAMES A. SEVEY, a citizen of the United States, residing at San Marcos, in the county of Hays and State of Texas, have invented certain new and useful Improvements in Saw-Filing Machines; and I do hereby declare the following to be a full, clear, and exact description of the invention, such as will enable others skilled in the art to which it appertains to make and use the same.

This invention relates to improvements in saw filing machines, and has for an object the arrangement of improved means for filing a saw of any desired kind.

Another object of the invention is the provision of means for filing a saw either square as in the common rip saw, or at an angle as in an ordinary cross cut saw, upon an adjustment of the machine, the file being arranged to operate upon each alternate tooth in opposite directions, both ends of a double ended commercial file being used.

Another object of the invention is the arrangement in a saw set, of improved means for filing a saw and automatically feeding the saw upward, the feeding means engaging the saw in the finished tooth and moving the finished tooth away from the file which insures uniform size and shape of teeth.

With these and other objects in view the invention comprises certain novel constructions, combinations, and arrangements of parts as will be hereinafter more fully described and claimed.

Figure 6:
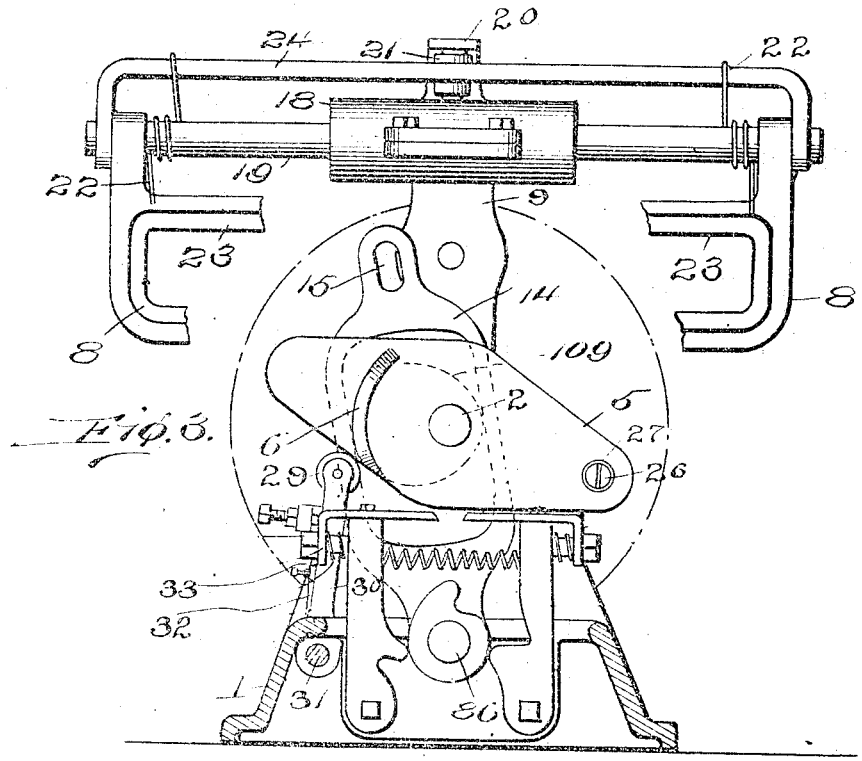
Figure 7:
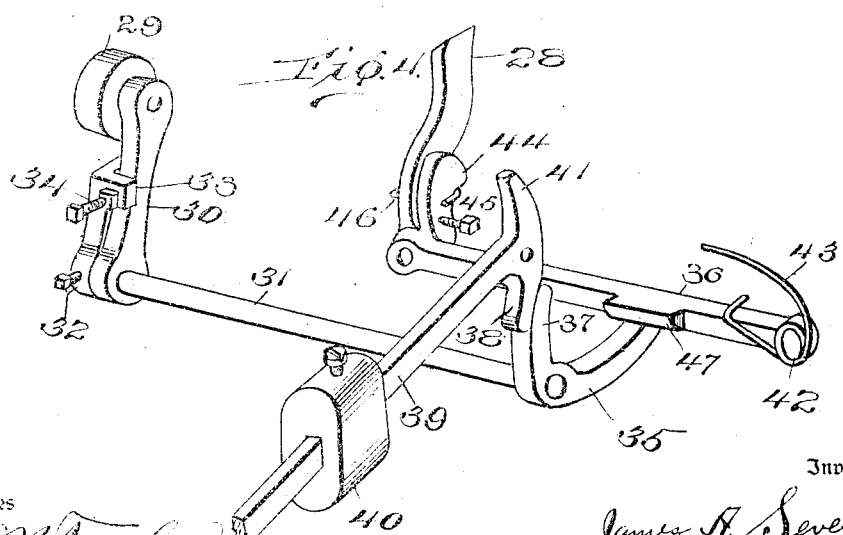

In the accompanying drawings: Figure 1 is a side view of an embodiment of the invention. Fig. 2 is a top plan view of the structure shown in Fig. 1. Fig. 3 is a section through Fig. 1, approximately on line 3—3. Fig. 4 is a detail fragmentary perspective view of the saw feeding mechanism removed. Fig. 5 is a section through Fig. 1 on line 5—5. Fig. 6 is a detail view of one of the power gears and associated parts. Fig. 7 is a detail fragmentary sectional view disclosing the frame locking pin. Fig. 8 is a fragmentary top plan view of the device and associated parts embodying certain features of the invention. Fig. 9 is a side view of the structure shown in Fig. 8, certain parts being broken away to better illustrate the invention. Fig. 10 is a view similar to Fig. 8, the same being shown closed and a hand-saw applied. Fig. 11 is a side view of a clamping member embodying certain features of the invention.

In order that the invention may be more clearly understood an embodiment of the invention is shown in the accompanying drawings in which 1 is a base formed of any kind of material, as for instance cast metal, upon which are mounted the various moving parts of the device. Mounted on base 1 is a main power shaft 2 which is supported by suitable bearings and which has secured thereto at one end a tight pulley 3. A loose pulley 4 is associated with tight pulley 3 for receiving the belt whenever desired. At the end of the main shaft 2 opposite pulley 3 is arranged a combined cam and crank member 5 which is rigidly secured to shaft 2 so as to be rotated thereby. Cam and crank member 5 is formed with a projecting cam 6 which extends from the face of member 5 and is arranged to engage a projecting rail 7 extending from the file carrier 8. Pivotally mounted on shaft 2 is a frame 9 which is held stationary by a locking pin 10 when it is desired that the file 11 shall move horizontally and cut the teeth square. When it is desired that the file 11 shall engage and operate against the saw at an angle the locking pin 10 is moved until the same is disengaged from bracket 13 and engages yoke 14. A slot 15 is provided in the upper end of yoke 14 for accommodating pin 10 when it is desired to connect the yoke with the frame 9. A slot 16 is provided in frame 9 for accommodating an operating member 17 which passes through slot 16 and is rigidly secured to pin 10 so as to reciprocate the pin as desired for causing the pin to engage either bracket 13 or yoke 14 so as to cause frame 9 to remain stationary for causing the file to move in a horizontal direction or to cause frame 9 to tilt for causing the file to move at an angle to the horizontal. Frame 9 carries at its upper end a bearing 18 which accommodates shaft 19, and also is formed with a bracket 20 in which is mounted a roller 21.

Shaft 19 is part of the file carrier 8, and is adapted to slide freely in bearing 18. In order to positively hold the projecting rail 7 either in engagement with the projecting cam 6 or the combined cam and crank 5, springs 22 are provided which are preferably arranged near each end of shaft 19. These springs bear at one end against the cross bar 23 of carrier 8 and at the other end against a retaining guide or bar 24 which is loosely pivoted to shaft 19 and which bears continuously against roller 20 as the carrier 8 is moved back and forth regardless of whether or not the same is tilted or moved horizontally. By this construction and arrangement the file 11 is caused to positively move away from the saw as soon as the projecting rail 7 moves off of the projecting cam 6 and is held positively out of engagement with the saw until cam 6 again swings the carrier forward. It will be observed that by this means the carrier is swung or pivotally mounted, and is yieldingly held in one position and positively forced into another position by a movable cam member.

The carrier 8 is formed with a central grooved or channel member 25 which accommodates a stud or pin 26 projecting from the combined cam and crank member 5. Stud 26 carries an anti-friction roller 27 for reducing friction, and causing easier movement of the carrier 8. The arrangement of the grooved or channel member 25, and stud 26 presents means by which the carrier 8 is moved in a certain sense by the cam action of the stud 26 acting on the walls of the channel member 25 for moving the carrier back and forth.

Upon each half revolution of the main shaft 2 and of the combined cam and crank 5 the feed pawl 28 is given a reciprocatory movement for feeding the saw forward one tooth. The feed pawl 28 is arranged to engage the last saw tooth which has been filed in its movement so as to always evenly feed the same forward the correct distance so that the machine will not only file the various teeth properly but will resize the teeth and even the same as the feed pawl always operates upon a tooth of the correct size. When either end of the combined cam and crank 5 engages and moves roller 29 (Fig. 4) the same will, of course, move arm 30 which is loosely mounted upon a rock shaft 31. A stop 32 is rigidly secured by any desired means to rock shaft 31, and is provided with a lug 33 in which is mounted an adjusting screw 34. When the arm 30 is moved the same will press against lug 33 or screw 34 and consequently move stop 32 which will in turn rock shaft 31. Shaft 31 is mounted in suitable bearings in base 1 and carries on the end opposite stop 32 a feed cam 35 which engages at one end a lever actuating arm 36, and which merges into a weight releasing finger 37 at the opposite end. Finger 37 engages the projecting portion 38 of weight arm 39 so as to raise the weight 40 whenever pawl 38 is operated. Arm 39 carries a projection 41 which extends opposite to the projecting portion 38 and is designed to press against one of the arms 77 as hereinafter fully described for permitting weight 40 to assist in clamping tightly the saw being operated upon at all times except when pawl 28 is being moved. Arm 39 is supported by a pivotal pin 39' which is supported in suitable projections or ears extending from base 1, (Fig. 2). Arm 36 is pivoted to the frame at 42 and is normally held in its lowered position by a spring 43. At the end of arm 36 to which pawl 28 is pivoted is arranged a projection 44 which projects from arm 36 and acts as a stop for pawl 28. Projection 44 carries a set screw 45 which extends through the same and presses against pawl 28 for adjusting the position of the pawl in order to cause the same to properly engage the teeth of the saw, a spring 46 being used for giving the pawl 28 a continuous tendency to engage the end of the adjusting screw 45 or projection 44. Arm 36 is also provided with an enlargement 47 so as to provide ample space against which feed cam 35 may press.

By reason of the structure embodying the saw feeding mechanism just set forth the saw is fed or moved intermittently as the file is operated so that at each stroke of the file a new tooth will be presented. This saw feeding mechanism is intended to operate as set forth regardless of the way that the file carrier 8 operates, that is, regardless of whether or not the file carrier is operating at an angle or horizontal. The feeding mechanism is adapted to feed forward saws of any kind, and saws having various sized teeth. The adjusting of pin or screw 34 causes pawl 28 to be moved to a greater or less extent accordingly to the size of the teeth engaged thereby.

In order to hold the various saws properly in place a vise structure is provided (Figs. 8 to 10 inclusive) which is adapted to support the saw properly regardless of the size or make thereof. This vise structure is arranged to be adjusted in various particulars for accommodating a band-saw, an ordinary hand-saw, an ordinary circular saw, and also a concave saw. The vise structure is provided with a frame 48 which is secured to base 1 in any desired manner, as for instance by bolts or screws, and which has formed at its upper part a guideway 49 which supports and guides a saw supporting member 50. Saw supporting member 50 is formed on the arc of a circle and might be termed a saw supporting quadrant as by its structure it will permit various sized concave saws, as well as other saws, to be mounted thereon and correctly positioned for causing the file 11 to properly engage the teeth thereof. The saw supporting member 50 is formed with an arc shaped slot 51 through which projects the threaded end of a clamping member 52. Clamping member 52 (Fig. 11)

is provided with an enlargement 53 through which a threaded aperture 54 extends. Enlargement 53 is formed with shoulders 55 and 56 which engage the under side of the guide-ways 49 so that when the nut 57 is tightened member 50 will be clamped firmly in position. Extending through aperture 54 is a threaded shaft 58 which has a crank 59 connected therewith at the outer end for operating the shaft. It will be evident that whenever crank 59 is rotated shaft 58 will be rotated and member 52 will be moved longitudinally of the guide-way 49 so as to accommodate different sized saws, the nut 57 on member 52 being first loosened. The outer end of the saw support 50 carries a threaded extension or stud 60 which has mounted thereon a cone center 61, the cone center 61 being clamped in position as well as the saw by a suitable nut 62. Associated with the guide-way 49 are jaws 63, one of which is rigidly secured to the frame 48, and the other of which is secured to a pivotally mounted member 64, which member is pivotally mounted at 65 to frame 48. The pivotally mounted member 64 carries a threaded shaft 66, which shaft has rigidly secured thereto a crank member 67 for actuating the same. Shaft 66 is mounted in a bracket or extension 68 at one end, and at the opposite end is threaded in a sliding guide 70, a stop 69 preventing longitudinal movement of the shaft in one direction, and extension 68 of member 64 engaging the crank member 67 limiting longitudinal movement in the opposite direction. Slidingly mounted upon pivotally mounted member 64 is a guide 70 which carries a pair of stop pins 71. Stop pin 71 is normally held in the position shown in Fig. 2 by a spring 72, but may be pushed therefrom when occasion demands. The guide 70 is formed with a lug or extension 73 (Fig. 9) which is formed with a threaded aperture through which the threaded shaft 66 extends so that upon the rotation of shaft 66 in either direction the guide 70 will be moved toward or from the end of pivotally mounted member 64. In operating on small circular saws, band-saws, and ordinary hand saws the pivotally mounted member 64 is maintained closed so that the vise jaws 63 may clamp the saw and hold the same in proper position for being filed and set as hereinafter fully described. When the vise jaws are closed the same are held yieldingly together or against a saw mounted therein by an adjustable clamp 74 which is supported by a suitable bearing 75 connected with the frame 48. The clamp 74 is formed with a reciprocating and rotating shaft 76 which has rigidly secured thereto at each end an arm 77. One of the arms 77 is provided with a threaded aperture through which extends a threaded shaft 78 having a crank 79 secured thereto.

The shaft 78 carries a foot 80 which is designed to press against either the saw when the same is arranged as shown in Fig. 8, or against pivotally mounted member 64 when the machine is arranged as shown in Fig. 2. A suitable spring 81 is provided which presses against bearing 75 and against one of the arms 77 for giving the shaft 76 a tendency to move in such a direction as to cause foot 80 to engage the saw, the action of spring 81 being within certain described limits determined by the length of the spring. When it is desired to clamp the saw properly in place the shaft 78 is rotated and presses against the saw or against the pivotally mounted member 64, and in pressing against the same presses spring 81, which acting through shaft 76 and the arm 77 causes foot 80 to yieldingly press against the saw or the pivotally mounted member 64. When a band saw is clamped in place the pins 71 are arranged to engage the back of the saw and prevent any reverse movement thereof when the file engages the teeth of the saw. When a hand-saw is being operated upon, as shown in Fig. 10, these pins cannot be used as the back of the saw is at an angle to the teeth so that a clamping member 82 is provided, which is firmly clamped to the saw and extends parallel with the teeth. Clamping member 82 may be made of wood or any desired material which is provided with a straight edge against which the edge 83 may press. Clamping member 82 is fitted on to the saw so that the straight edge will be parallel with the teeth of the saw and is then clamped rigidly in position by bolts, screws, or the like. After the clamping member 82 has been placed in position the saw may then be placed in the vise or jaws 63 and member 70 caused to push the saw forward to its correct position and hold the same in said position. When the clamping member 82 is used guide 70 is moved back until the front edge 83 thereof is caused to engage the back of the clamp 82 and consequently guides the saw in its upward movement. When the guide 70 is operating in this manner both of the stop pins 71 are pressed outward against the action of the springs 72. The arm 77 opposite to that carrying the shaft 78 is adapted to contact with projection 41 which extends from arm or lever 39 so that the weight 40 is acting continuously on the arms 77 and shaft 76, as well as on the threaded shaft 78 and foot 80 for firmly clamping the saw in place. By the arrangement of the saw feeding mechanism heretofore described and shown in Fig. 4, the weight is raised and consequently the pressure thereof is removed from the clamp 74 whenever the feed pawl 28 is about to move the saw one step forward, so that the only tension on the saw will be the tension provided by spring 81, which may be easily regulated by properly adjusting a threaded shaft 78.

Associated with the filing mechanism and the various means for holding the saw in position and feeding the same through the machine are a plurality of members that form a saw setting device which is adapted to operate in conjunction with the filing mechanism or independently thereof, the main operating shaft of the setting mechanism being the same as the main operating shaft of the filing mechanism. The main shaft 2 carries a gear wheel 84 which is rigidly secured thereto, and which meshes with a second gear wheel 85 loosely mounted upon shaft 86. Shaft 86 (Fig. 6) has rigidly secured thereto a disk 87 formed with a suitable hub for receiving a clamping or set screw for holding the disk rigidly to shaft 86. The disk 87 is formed with a notch 88 which is designed to receive a laterally moving bolt structure 89 which is mounted in a slot 90 formed in gear wheel 85. When it is desired that gear wheel 85 shall transmit motion to shaft 86 in order to operate the hammers of the setting mechanism, bolt structure 89 is moved toward the shaft 86 until the same is positioned in the notched out portion 88 of disk 87, whereupon the gear wheel 85 will be locked to shaft 86 and will consequently turn the same. The gear wheels 84 and 85 are preferably of the same size so that the main shaft 2 and shaft 86 will operate at the same speed in order that the setting mechanism will operate in proper timed relationship to the filing mechanism.

The setting mechanism is not claimed in this application and will not be described in detail but the above reference is deemed desirable in order that the purpose of a portion of the structure may be understood.

The rotation of the shaft 86 will not in any way affect the operation of the yoke 14, as the yoke 14 simply uses the shaft 86 as a bearing and is moved only by the cam 109. Cam 109 is rigidly secured to the main shaft 2, and consequently continuously oscillates yoke 14, but the oscillation of yoke 14 will have no effect on any of the mechanism, unless locking pin 10 is moved until the same projects into slot 15.

The file is preferably an ordinary commercial double ended file which has its ends positioned in suitable file plugs 119 and 120. These file plugs are properly held in position by clamps 121 and 122 which are bolted to suitable projections on carrier 8 by bolts 123 passing through slots 124. By this structure of clamps and bolts for holding the same in place the file may be adjusted as occasion may require so as to give a deep cut or a shallow cut.

It will be observed that the machine in its entirety will by proper adjustment operate in various manners upon a saw, and by further adjustment will operate in various manners on various kinds of saws. The device may be so adjusted as to act as means for filing the teeth of a saw square without further operation on the saw. By a slight adjustment the filing mechanism may be changed for filing the teeth of a saw at an angle. In either event the file is arranged so that both ends thereof will be used, and only a half stroke of the file will be utilized, or substantially a half stroke. By a further adjustment of the mechanism the filing mechanism may be caused to operate and a second or setting mechanism caused to operate in conjunction with the filing mechanism. This adjustment may be continued and varied so as to stop the filing mechanism but continue the operation of the setting mechanism so that the device may by proper adjustment be used for differently operating upon a saw as occasion may demand, namely for either setting a saw, filing a saw, or filing and setting a saw at the same time.

The machine is so formed as to have a main or principal shaft from which movement is transmitted to all of the various moving parts for the proper operation of the same in timed relationship to each other. The main shaft is arranged centrally of the machine so that all parts of the machine work toward a central point which is the center of the main shaft. If a line were drawn from the center of the main shaft outward therefrom and as a continuation thereof the same would strike at the operating point of the pawl 28, file 11, and the lower edge of the tooth of the saw which is being operated upon. By thus arranging the machine so that all of the parts work toward or in conjunction with a central line the adjustment of the various parts is simplified so that not only may the teeth be filed correctly when the same are filed square, but also the teeth may be filed correctly when the same are filed at an angle.

What I claim is:—

1. In a device of the class described, a base, means arranged on the base for supporting a saw, means for intermittently feeding said saw, mechanism for alternately moving opposite ends of a file in engagement with the saw upon each movement of the latter, and in a direction for filing the cutting edge of the teeth at a given angle with the side of the saw blade, and means for causing the file to file the cutting edge at a different angle.

2. In a machine of the class described, a base, means for supporting and guiding a saw, means for feeding the saw, a double ended file for filing the teeth of the saw, and means operating said file including a carrier movable in two directions at an angle to each other for causing the file to engage the teeth of said saw for half the travel of the file in each direction, whereby the saw edge is always turned outward.

3. In a device of the class described, a base, means arranged on the base for supporting a saw, means for intermittently feeding said saw, means movable toward and away from the saw for alternately moving opposite ends of a file in engagement with the saw, and in a direction for filing the cutting edge of the teeth at a given angle with the side of the blade, and means for filing the cutting edge at a different angle.

4. In a device of the character described, a base, a vise structure for supporting a saw, means for intermittently moving said saw through said vise, a file arranged to engage the teeth of said saw for filing the same, a reciprocating carrier for moving said file, means for moving said reciprocating carrier and means for causing said reciprocating carrier to cause said file to engage and file a tooth on said saw upon each movement of the reciprocating carrier.

5. In a device of the character described, a base, a saw supporting and guiding structure, intermittently operated means for engaging the teeth of the saw and intermittently moving the saw along, a double ended file arranged to engage and file the teeth of the saw, a reciprocating carrier for said file, and means for guiding the said reciprocating carrier so as to utilize one end of said file when the fil is moving in one direction and utilize the opposite end of the file when e file is moving in the opposite direction.

6. In a device of the character described, a base, means for supporting a saw on said base, a double ended file for engaging the teeth of said saw and operating thereon, a reciprocating carrier for said file, a rotating member engaging said carrier for reciprocating the same, a cam engaging the reciprocating member for moving the reciprocating member in such a manner as to cause the file to engage one of the teeth of said saw for half the movement of the file upon each reciprocation thereof, and a saw feeding member engaging the finished tooth for moving the saw.

7. In a device of the character described, a base, a saw supporting member, a double ended file arranged to engage the teeth of a saw positioned on said saw supporting member, a carrier for supporting and operating said file, means for reciprocating said carrier, a cam arranged to hold said file against said saw for part of the travel of the file in each direction, means for moving said reciprocating carrier away from said saw, and a feeding mechanism co-acting with said carrier for intermittently feeding said saw through said support.

8. In a device of the character described, a base, a saw support for supporting a saw on said base, a reciprocating member for holding a double ended file, means for moving said reciprocating member, a cam for holding said reciprocating member in such a position that by its movement it will cause said file to engage said saw for part of the movement of the file in each direction, and a saw feeding mechanism arranged to engage the filed tooth of said saw for moving the saw forward with a step by step motion.

9. In a device of the character described, a base, means for supporting a saw on said base, means for moving a double ended file transversely of said saw for causing the same to engage the saw for part of the travel of the file in each direction, and means co-acting with said file supporting means for engaging said saw and intermittently feeding said saw forward, a movement of said saw being made upon each half reciprocation of said file.

10. In a machine of the class described, a base, a saw supporting and guiding member, means for feeding the saw, a reciprocating file carrier arranged to receive a double ended file, means for tilting said carrier upon each stroke thereof for causing the carrier to press the file against said saw for half its travel in each direction, whereby both ends of the file are used.

11. In a machine of the class described, a base, means for supporting and guiding a saw, a file carrier arranged to carry a double ended file, a cam for guiding the file carrier so as to press the file carried thereby against said saw for half the stroke in each direction whereby both ends of the file are utilized and the saw is operated upon at each stroke of the carrier, and means for feeding said saw through the machine.

12. In a machine of the class described, a base, means for supporting and guiding a saw, said means comprising a pair of vise jaws, a stationary member, a pivotally mounted member, an adjustable clamp for pressing said pivotally mounted member against said stationary member for clamping said saw in place, a pivotally mounted arm formed with a projection engaging said adjustable clamp for pressing the same against said movable member, and a weight for continually acting upon said arm, means for feeding a saw through said saw supporting means, means for raising said weight at the same time that the means for feeding said saw is operated.

13. In a machine of the class described, a base, a filing mechanism mounted on said base, means for operating said filing mechanism, a saw feeding mechanism associated with said filing mechanism and operating in timed relationship thereto for feeding a saw through the machine, and a saw supporting and guiding member arranged to support a saw in proper position for being engaged by said saw feeding means and said filing mechanism, said saw supporting means comprising a vise structure, an adjustable clamp arranged to press against said vise structure for firmly clamping a saw positioned therein, a pivotally mounted arm formed with a projection engaging said adjustable clamp for exerting tension thereon for causing the clamp to press against said vise structure, a weight arranged on said arm, and means associated with the filing mechanism for raising said weight and removing the strain thereof from said adjustable clamp during the time that the saw feeding mechanism is being operated.

14. In a machine of the class described, a base, means for feeding a saw through said machine, a file carrier, a rotating member, a stud projecting from said rotating member engaging said file carrier for reciprocating the same, and a cam projecting from said rotating member engaging said file carrier and acting thereon for causing the file carried by said carrier to engage said saw for half the stroke of the carrier in each direction, whereby both ends of the file are utilized and the saw is operated upon at each stroke of the file carrier.

In testimony whereof I affix my signature in presence of two witnesses.

JAMES A. SEVEY.

Witnesses:
ROBT. T. LANG,
A. L. KITCHIN.